(12) United States Patent
Bradford

(10) Patent No.: US 10,165,635 B1
(45) Date of Patent: Dec. 25, 2018

(54) MULTIPLE LED STRINGS DRIVEN FROM A CONSTANT CURRENT POWER SUPPLY

(71) Applicant: Cree, Inc., Durham, NC (US)

(72) Inventor: Everett Bradford, Apex, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/839,043

(22) Filed: Dec. 12, 2017

(51) Int. Cl.
| H05B 37/02 | (2006.01) |
| H05B 33/08 | (2006.01) |
| G05F 1/565 | (2006.01) |
| G05F 1/46 | (2006.01) |

(52) U.S. Cl.
CPC ......... *H05B 33/0818* (2013.01); *G05F 1/461* (2013.01); *G05F 1/565* (2013.01); *H05B 37/02* (2013.01)

(58) Field of Classification Search
CPC ..... H05B 33/0818; H05B 37/02; G05F 1/461; G05F 1/565
USPC .......................................................... 315/206
See application file for complete search history.

(56) References Cited

U.S. PATENT DOCUMENTS

| 2007/0139317 A1* | 6/2007 | Martel | H05B 33/0827 345/82 |
| 2008/0297067 A1* | 12/2008 | Wang | H05B 33/0815 315/294 |
| 2011/0062872 A1* | 3/2011 | Jin | H05B 33/0818 315/122 |
| 2012/0081009 A1* | 4/2012 | Shteynberg | H05B 33/083 315/122 |
| 2013/0175934 A1* | 7/2013 | Fujita | G09G 3/3426 315/186 |
| 2014/0232270 A1* | 8/2014 | Kimura | H05B 33/0815 315/122 |
| 2015/0312983 A1* | 10/2015 | Hu | F21K 9/1355 315/186 |
| 2016/0165680 A1* | 6/2016 | Johnson | H05B 33/083 315/51 |
| 2016/0270182 A1* | 9/2016 | Beijer | H05B 33/0872 |

* cited by examiner

*Primary Examiner* — Don Le
(74) *Attorney, Agent, or Firm* — Coats & Bennett, PLLC

(57) ABSTRACT

A controller in a solid state luminaire implements a nested control loop to drive multiple, parallel-connected, heterogeneous strings of series-connected LEDs using a constant current power supply. The current through each string is independently controlled by a current regulator in series with the LEDs. An inner (current) control loop alters the relative drive strength of each LED string, to achieve desired luminous characteristics, such as CRI, CCT, and the like. An outer (voltage) control loop monitors the output voltage of the power supply, and the total current drawn. The outer control loop adjusts a gain factor applied to the control signals for each current regulator, to control the total current drawn—while maintaining the relative ratios of drive strength between the strings—so as to maintain the power supply output voltage at a substantially constant value.

20 Claims, 7 Drawing Sheets

MULTIPLE LED STRINGS DRIVEN FROM A CONSTANT CURRENT POWER SUPPLY

FIELD OF INVENTION

The present invention relates generally to solid state lighting, and in particular to a circuit and method of driving multiple LED strings, at arbitrary ratios, from a constant current power supply.

BACKGROUND

Solid state lighting devices are well known in the art, and are rapidly replacing conventional lighting sources, such as incandescent bulbs and fluorescent lighting fixtures. As used herein, the term Light Emitting Device (LED) means a solid state lighting device, such as a light emitting diode or laser diode. The numerous advantages of LEDs over conventional lighting sources include: LEDs consume less energy to produce comparable lighting; LEDs do not generate heat on the scale of incandescent lights or even the ballasts of fluorescent fixtures; LEDs are generally fabricated with plastic or epoxy housing and lenses, and hence are more rugged; LEDs last longer than conventional light sources; LEDs do not contain toxic gases which may be released on breakage; and LEDs require no "warm-up" and may be cycled at high frequencies.

Due to these advantages, light fixtures, also known as luminaires, became commercially available soon after the development of practical white light LEDs. As depicted in FIG. 1, these luminaires 10 typically assemble a homogenous plurality of white LEDs in series into a single string 12, driven by a power supply 14 that provides a substantially constant drive current. These power supplies 14 typically include a control circuit that varies the output voltage as necessary to attempt to supply a constant current to the fixed load of the LED string 12. Many such power supplies 14 include a "dimming" or brightness control feature, whereby the constant output current can be adjusted, either in discrete steps, or continuously over a range, to drive the LED string 12 at different levels of illumination (also referred to herein as luminous flux). As used herein, the term "constant current power supply" refers to a power supply circuit that attempts to output a substantially constant current to a load, at any particular selected drive (brightness) level. The constant current power supply 14 typically includes a feedback control loop which monitors the current consumed by a load, and varies the output voltage to maintain the current at a substantially constant value. Of course, in the real world, fluctuations in the output current are always present, due to supply power variations; component heating, aging, or tolerances; variations in individual LEDs; changes in temperature or humidity; and the like.

Light sources—both individual LEDs and luminaires constructed with them—may be characterized by various luminous characteristics, such as Color Rendering Index (CRI), chromaticity, Correlated Color Temperature (CCT), and luminous flux.

The CRI of a light source is a measure of the ability of the light generated by the source to accurately illuminate a broad range of colors. Light sources are "indexed" to the color rendering properties of a black-body radiator. A CRI of 100 indicates that the perceived color of a set of test colors being illuminated by the light source are the same as if the test colors were irradiated by the black-body radiator. Daylight has a CRI of 100; incandescent light bulbs have a CRI of around 95; fluorescent lamps have a CRI of around 70-85; and monochromatic light sources have a CRI close to zero.

The chromaticity, or color, of a light source may be expressed as a "color point" in a coordinate system of a color space, such as a tristimulus value (X, Y, Z) or the color coordinates (CCx, CCy) on a chromaticity diagram. Alternatively, because a black-body radiator emits a range of colors depending on its temperature, color information may also be expressed as a CCT, which is the temperature (on the Kelvin scale) at which the heated black-body radiator matches the color of the light source. The CCT of white light sources ranges from around 2700 K to 6500 K. Light at the lower end, around 2700 K, has a yellowish color (referred to as "warm" white light), and light at the upper end, around 6500 K, has a blueish color (referred to as "cool" white light).

The luminous flux of a light source refers to the intensity of its illumination, measured in lumens, where one lumen is the amount of light emitted per second in a unit solid angle of one steradian from a uniform source of one candela. The luminous flux of most LEDs varies with the current with which it is driven; however, LEDs may be manufactured to different sizes and hence may have different luminous flux capabilities.

As depicted in FIG. 1, the drive circuits 10 of early LED luminaires typically included a single string 12 of homogeneous white light LEDs, all outputting the same luminous characteristics, and all driven together in series. For example, all LEDs in such a luminaire may be white Light Emitting Diodes. A white LED is a blue LED that includes a phosphor which absorbs some of the high-energy blue light and emits lower-energy yellow, green, and red light. The phosphor-converted light mixes with an unchanged portion of the blue light, producing perceptually white light. White LEDs typically have either a poor CRI and high efficacy, or a high CRI and poor efficacy, but rarely can achieve both high CRI and efficacy. The single-string luminaire has a set chromaticity/CCT, depending on the particular LEDs used, which are typically on the cool end of the spectrum.

In contrast, FIG. 2 depicts a circuit configuration 20 typical of more modern LED luminaires. These luminaires mix, or blend, the light from a plurality of heterogeneous strings 24, 28, of LEDs, and independently control the intensity of each string. In particular, a first string 24 comprises Blue-Shifted-Yellow (BSY) LEDs. Similarly to the white LEDs described above, BSY LEDs emit blue light, and phosphors shift some of the light to the yellow range of the spectrum; the combination of blue and yellow produces a cool white light. The first string 24 of BSY LEDs is driven by a first constant current regulator 26, such as a buck regulator, which controls the luminous flux of light generated by the first string 24. A second string 28 of, e.g., red or red-orange (RDO) LEDs, connected in parallel with the first string 24, is driven by a second constant current regulator 30, which independently controls the luminous flux of light generated by the second string 28. Both current regulators 26, 30 are controlled by a controller 32, such as a microprocessor or microcontroller, which controls the overall, mixed, light output by independently controlling the intensity of the two (or more) LED strings 24, 28. The ratio of intensities may be predetermined, user programmed, or dynamically changed in response to various inputs or sensed conditions. A constant voltage power supply 22 provides power for all of the luminaire components.

In the circuit 20, luminous characteristics such as CRI and CCT may be tailored to specific applications, or preset in ranges that have been shown to maximize user comfort and acceptance. For example, the TRUEWHITE® technology lighting available from Cree, Inc. of Durham, N.C. combines white light LEDs, such as BSY, with RDO and unsaturated yellow LEDs, to create a warm white light with a CRI of over 90. Additionally, the relative drive strengths of different LED strings may be dynamically adjusted to produce a variety of effects. For example, Cree's sunset dimming technology alters the CCT of a light source as a function of its dimming level, mimicking incandescent lighting.

A variety of highly integrated, low-cost, constant current power supplies 14 are commercially available, in form factors designed for use in solid state luminaires. Furthermore, many of them include integrated dimming capability, such as from user input, remote control, sensing ambient lighting conditions, and the like. In many cases, it would be advantageous to utilize these constant current power supplies 14 with the advanced heterogeneous, multi-string configurations 20, to achieve the above-stated advantages of controlling luminous characteristics, such as CRI, CCT, and the like. However, since modern LED lighting circuits 20 are designed to operate from a constant voltage power source 22, it is not possible to use these constant current power supplies 14 directly.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a controller in a solid state luminaire implements a nested control loop to drive multiple, parallel-connected, heterogeneous strings of series-connected LEDs using a constant current power supply. The current through each string is independently controlled by a current regulator in series with the LEDs. An inner (current) control loop alters the relative drive strength of each LED string, to achieve desired luminous characteristics, such as CRI, CCT, and the like. An outer (voltage) control loop monitors the output voltage of the power supply, and the total current drawn. The outer control loop adjusts a gain factor applied to the control signals for each current regulator, to control the total current drawn—while maintaining the relative ratios of drive strength between the strings—so as to maintain the power supply output voltage at a substantially constant value.

One embodiment relates to a method of selectively driving a parallel configuration of a plurality of strings of series-connected light emitting devices (LEDs) from a constant current power supply. A plurality of current regulators is provided, each connected in series with an associated string. A current through each string is individually regulated by controlling the associated current regulator. An output voltage of the constant-current power supply and a total current drawn by the plurality of strings are monitored. The total current drawn is controlled so as to maintain the output voltage of the constant current power supply at a substantially constant value.

Another embodiment relates to a control circuit operative to selectively drive a parallel configuration of a plurality of strings of series-connected light emitting devices (LEDs) from a constant current power supply. The control circuit includes a current regulator circuit connected in series with each string; a voltage monitoring circuit; a current monitoring circuit; and a controller operatively connected to each current regulator circuit, the voltage monitoring circuit, and the current monitoring circuit. The controller is operative to individually regulate a current through each string by controlling the associated current regulator; monitor an output voltage of the constant current power supply; monitor a total current drawn by the plurality of strings; and control the total current drawn so as to maintain the output voltage of the constant current power supply at a substantially constant value.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
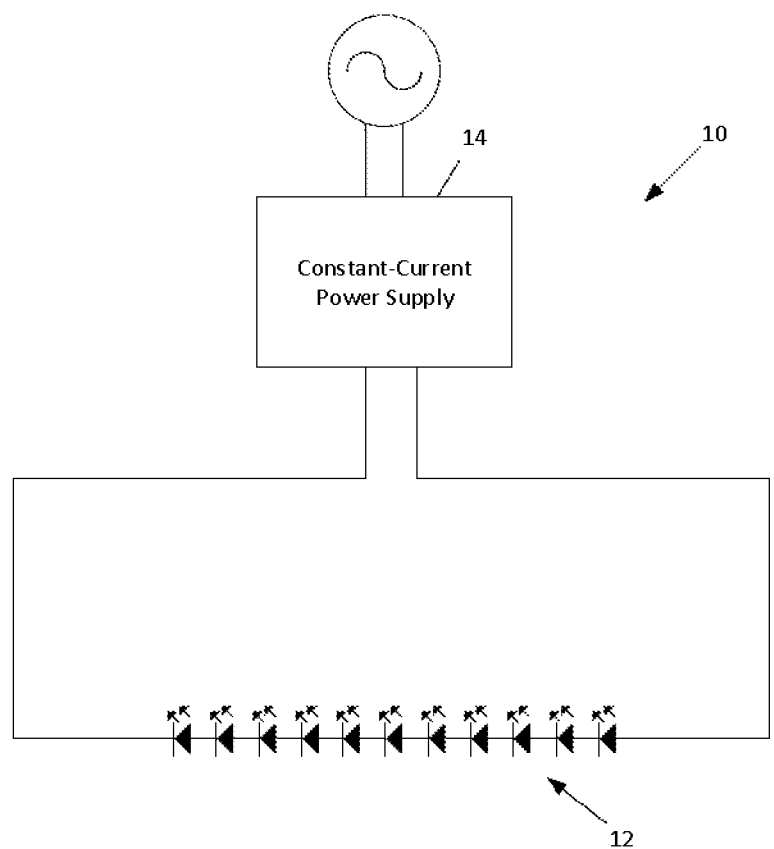
FIG. 1 is a functional schematic diagram of circuits in a conventional luminaire including a single string of LEDs.
Figure 2:
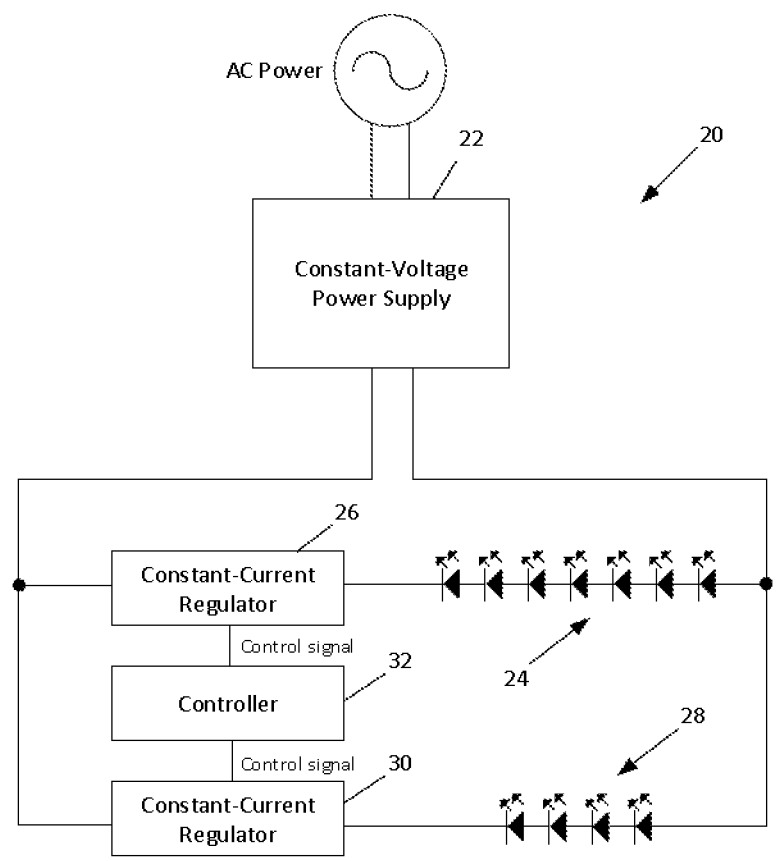
FIG. 2 is a functional schematic diagram of circuits in a luminaire including multiple heterogeneous strings of LEDs and a constant voltage power supply.
Figure 3:
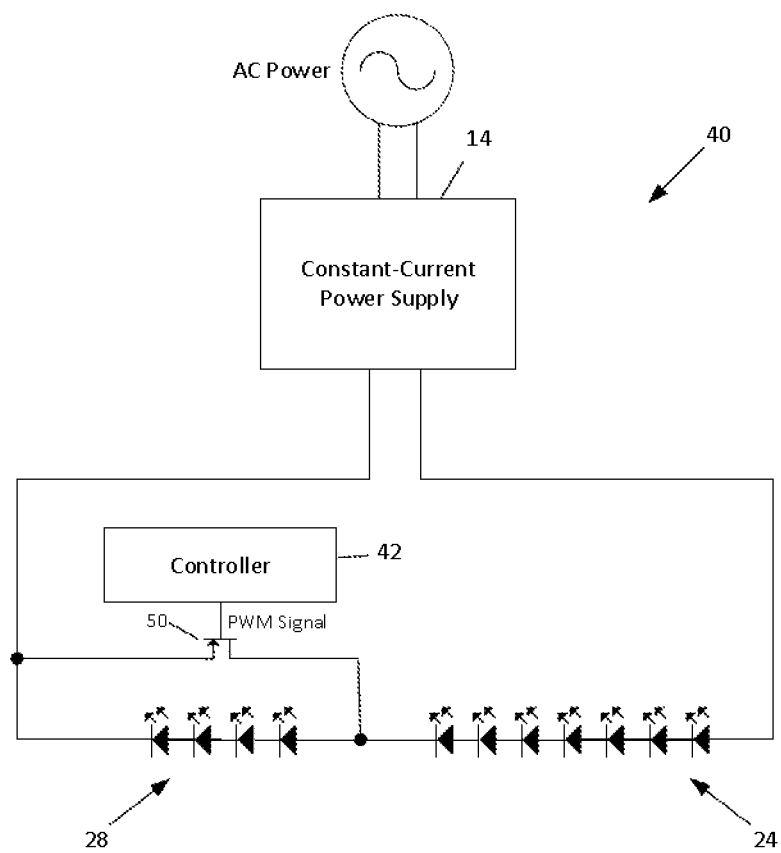
FIG. 3 is a functional schematic diagram of current shunting circuit for driving heterogeneous strings of LEDs using a constant current power supply.

FIG. 3 depicts one circuit 40 for utilizing a conventional, constant current power supply 14 in a modern, multi-string lighting solution. Similarly to the circuit 30 depicted in FIG. 2, light is mixed, or blended, from both a first string 24 of, e.g., BSY LEDs, and a second string 28 of, e.g., RDO LEDs.

Here, however, the first string 24 and second string 28 are connected in series—the LED configuration which the constant current power supply 14 was designed to drive. A controller 42 generates a Pulse Width Modulation (PWM) signal to control the duty cycle of a shunt switch, such as an FET 50. The path through the FET 50 diverts, or shunts, current from the first string 24 to ground, wholly or partially bypassing the second string 28. When the PWM signal from the controller 42 has a very low, or zero, duty cycle (i.e., it is mostly off), current flows through both LED strings 24, 28, generating a warm light. As the PWM duty cycle increases, more current is diverted around the second string 28, decreasing its brightness, and the mixed light output moves toward the cooler color temperature of the first string 24. At a very high, or full, PWM duty cycle (i.e., the switch 50 is mostly on), the luminous characteristics, such as color temperature, of the first string 24 dominate the overall illumination.

While the approach of FIG. 3 works to provide some control of luminescent characteristics such as color temperature, it is inefficient, since the switch 50 diverts current to ground. Additionally, the degree of control is inherently limited. For example, it is impossible to drive the second LED string 28 with a higher current value than the first LED string 24.

Figure 4:
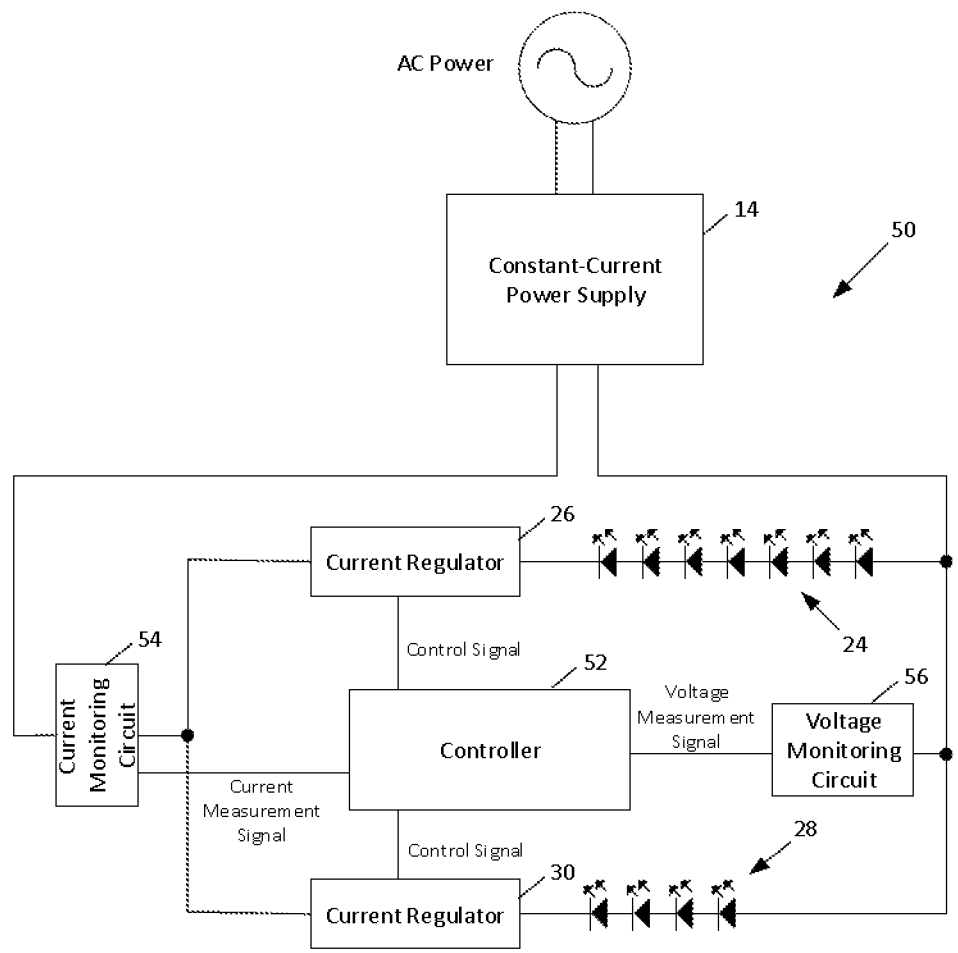
FIG. 4 is a functional schematic diagram of a circuit for driving heterogeneous strings of LEDs using a constant current power supply according to one embodiment of the present invention.

FIG. 4 depicts the circuitry 50 of a solid state, multi-string luminaire powered by a conventional, constant current power supply 14, according to one embodiment of the present invention. As in the circuit 20 of FIG. 2, a first string 24 of, e.g., BSY LEDs is driven by a first current regulator 26, which may for example comprise a buck regulator. A second string 28 of, e.g., RDO LEDs is connected in parallel with the first string 24, and is driven by a second current regulator 30. The first and second current regulators 26, 30 regulate the current in their respective LED strings 24, 28 as directed by a controller 52. The controller 52 independently controls each current regulator 26, 30 according to an inner control loop (or current control loop), to achieve a constant current in the associated LED string 24, 28, by outputting a control signal. These control signals are adjusted in their relative ratios in order to produce an overall illumination having desired luminous characteristics, such as CRI, CCT, and the like.

The controller 52 additionally receives inputs from a current monitoring circuit 54 and voltage monitoring circuit 56. The current monitoring circuit 54 measures the total current drawn from the constant current power supply 14—i.e., the sum of currents through each LED string 24, 28. The voltage monitoring circuit 56 measures the output voltage of the constant current power supply 14. The controller 52 uses these values to operate an outer control loop (or voltage control loop) which controls the total current drawn to maintain the power supply 14 output voltage at a substantially constant value. The controller 52 ratiometrically adjusts the control signals output to the current regulators 26, 30 by a gain factor determined by the outer control loop—thus controlling the total current drawn by the LED strings 24, 28—in response to a difference between the monitored voltage and a voltage setpoint. However, in adjusting the current regulator 26, 28 control signals, their relative values—that is, the ratio of current in each string 24, 28—is preserved, thus maintaining the desired luminous characteristics of the overall illumination. In effect, the controller 52 mimics a single string of LEDs, as seen by the power supply 14, by regulating the total current drawn to maintain the power supply 14 output voltage at a point within its normal operating window, for a given brightness level determined by the power supply 14.

The circuit 50 of the embodiment of FIG. 4 allows for a much greater variety of relative currents (and hence intensities) through the different LED strings 24, 28, than the current shunt approach depicted in FIG. 3. Furthermore, the circuit 50 presents advantages over using a constant voltage power supply 22, as depicted in FIG. 2, beyond enabling the use of the constant current power supply 14. In the circuit 20 of FIG. 2, to implement dimming, or brightness control, the controller 32 must receive some external command, or sense some condition, indicating a desired brightness level, and then regulate the total currents through the LED strings 24, 28 to achieve the desired overall luminous flux.

The circuit 50 depicted in FIG. 4 may directly (indeed, automatically) handle brightness controls integrated into the constant current power supply 14. As described above, these power supplies 14 often have either discrete levels of, or continuously variable, brightness provisions built in. In the circuit 50, the controller 52 will regulate the total current through all LED strings 24, 28 so as to maintain the input voltage at a generally constant level. When the power supply 14 receives a control input to dim the luminous flux of its output, it will reduce its output current. The outer control loop of the controller 52 will then regulate the current through the LED strings 24, 28—in the same (or perhaps different, in response to the new dimming level) relative ratios—to reduce the total current drawn, so as to maintain the same power supply 14 output voltage. No dimming control input is required at the controller 52.

Figure 5:
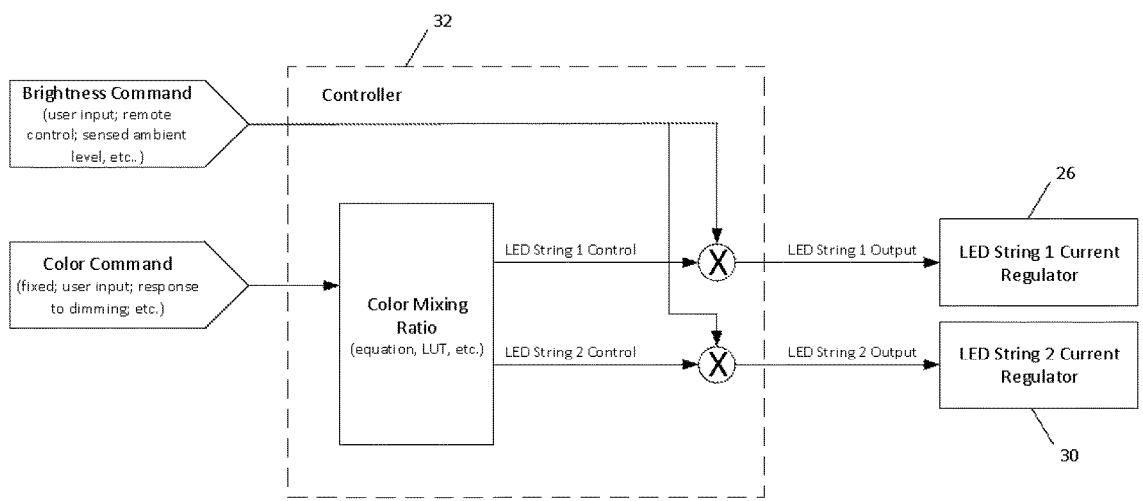
FIG. 5 is a control diagram for the circuit of FIG. 2.
Figure 6:
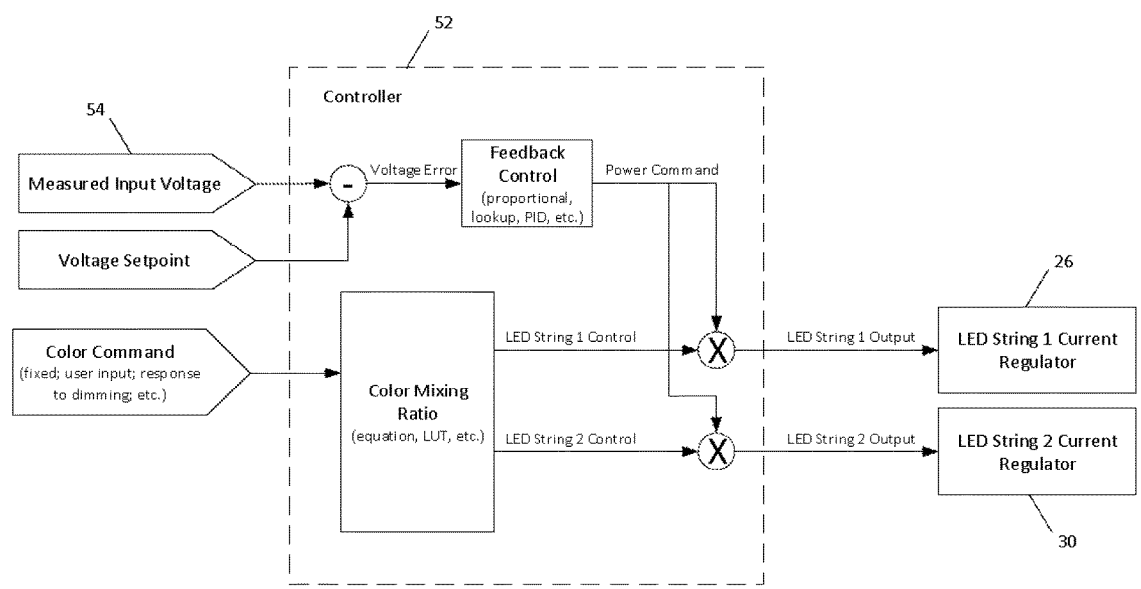
FIG. 6 is a control diagram for the circuit of FIG. 4.

This feature is further demonstrated in the control diagrams of FIGS. 5 and 6. FIG. 5 depicts a control diagram for the circuit 20 of FIG. 2, with a constant voltage power supply. The controller 32 receives input regarding desired luminous characteristics of the illumination to be generated—here, CCT is used as a representative example. The desired color temperature may be fixed, for example configured in the controller 32 or stored in non-volatile memory. Alternatively, the color command may be provided by a user. Another alternative is that the desired color may be derived from sensed ambient conditions, or vary as a function of the brightness of illumination produced (e.g., Cree's sunset dimming technology). A Color Mixing Ratio function of the controller 32 generates control information for driving each of a plurality of heterogeneous strings of LEDs, by individual current regulators 26, 30, to achieve the desired color. These control commands are then scaled up or down in response to a brightness input. The brightness command may be in response to user input (direct or via wireless remotely control), by remote command (e.g., from a central facility or campus building control program), in response to a sensed ambient illumination level, or the like. The controller 32 scales the LED string control signals, to achieve the desired luminous flux, while maintaining the relative ratios of current to achieve the desired color mix. The scaled control signals are then output to the individual current regulators 26, 30, which drive the LED strings.

FIG. 6, in contrast, depicts the control flow of the circuit 50 of FIG. 4, using a conventional, constant current power supply. The controller 52 receives desired color input, and generates control signals for the heterogeneous LED strings in a Color Mixing Ratio function, as described above with respect to FIG. 5 (this is the inner, or current, control loop discussed above). However, the controller 52 receives no brightness commands. Rather, a Voltage Setpoint, which is a voltage level that the outer, or voltage, control loop attempts to maintain, is semi-statically fixed. That is, at any given time, when the brightness of the luminaire is at a steady state value, the controller 52 operates to maintain the voltage output by the power supply at the Voltage Setpoint value. To do this, the voltage is measured by voltage monitoring circuit 54, and compared to the Voltage Setpoint. A Voltage Error signal drives a Feedback Control function, which may be implemented as a Proportional-Integral-Derivative (PID) control algorithm, a lookup table (LUT), a simple proportional algorithm, or the like. The Feedback Control function generates a gain factor, by which it scales up or down the individual LED string control signals by means of Power Commands. The resulting scaled LED string command signals are then output to the individual current regulators 26, 30, which drive each LED string. The outer (voltage) control loop hence operates to control the total current drawn by all LED strings, so as to maintain the power supply voltage at a substantially constant value—the Voltage Setpoint.

If the constant current power supply changes the brightness of the luminaire, it will alter the voltage output to the LED strings in order to effect the change in current. In response, the controller 52 will adjust the total current drawn by the LEDs in order to maintain the voltage at the Voltage Setpoint. At any steady state brightness level, the controller 52 effectively monitors the total current drawn by all LED strings, and controls it so as to maintain the output voltage of the constant current power supply at a substantially constant value.

Figure 7:
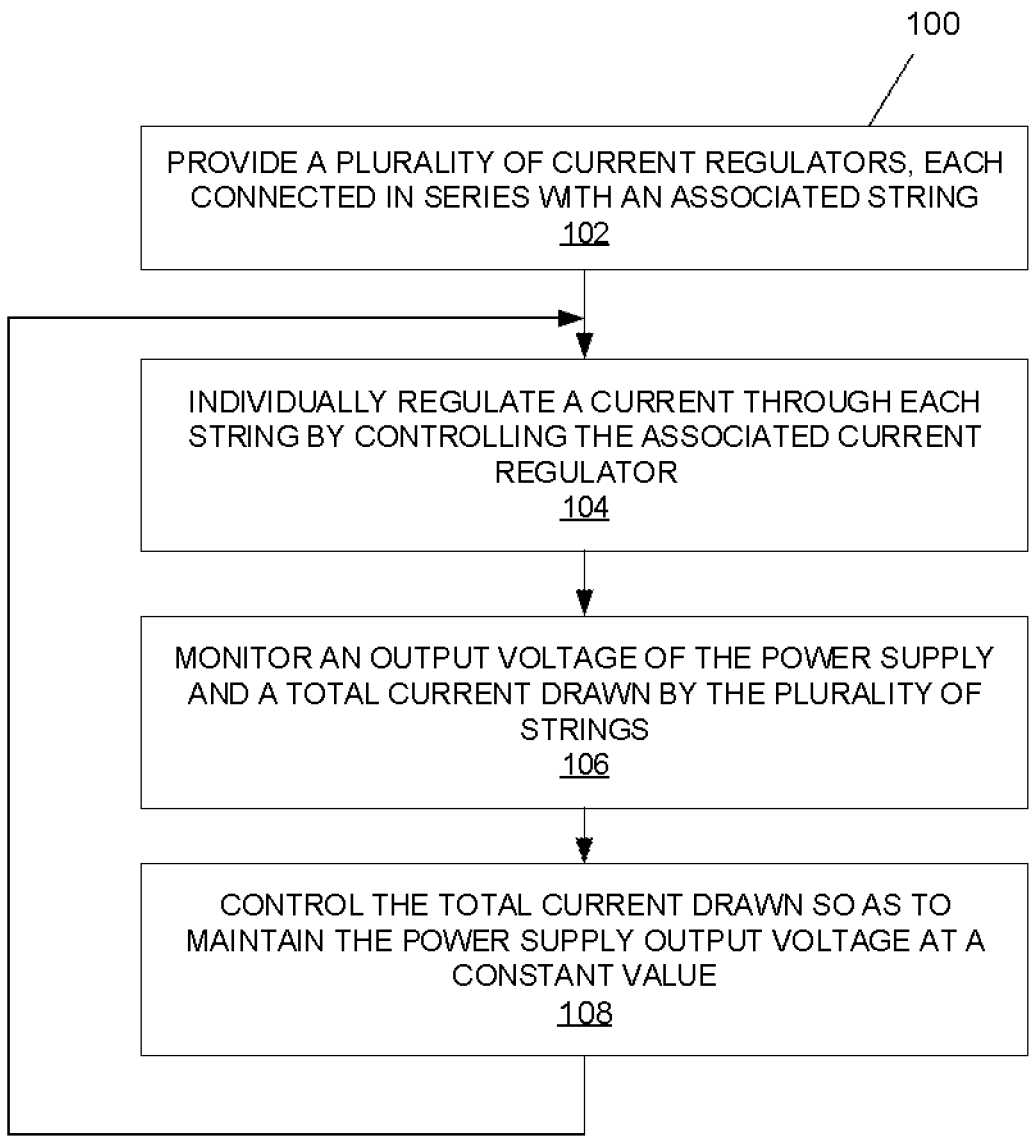
FIG. 7 is a flow diagram of a method of selectively driving a plurality of strings of series-connected LEDs from a constant-current power supply.

FIG. 7 depicts a method 100 of selectively driving a parallel configuration of a plurality of strings of series-connected light emitting devices (LEDs) from a constant-current power supply. A plurality of current regulators is provided (block 104). Each current regulator is connected in series with an associated LED string. A current through each LED string is individually regulated by controlling the associated current regulator (block 106). An output voltage of the constant current power supply, and a total current drawn by the plurality of strings, are monitored (block 108). The total current drawn is controlled so as to maintain the output voltage of the constant current power supply at a substantially constant value (block 110). As the output voltage of the constant current power supply changes due to a desired change in brightness of the luminaire, blocks 104-108 are repeated. Indeed, those of skill in the art will readily appreciate that the monitoring, controlling, and current regulating functions depicted as individual steps in the flow diagram of FIG. 7 are in fact continuous and on-going.

For convenience and ease of explanation, embodiments of the prior art and of the present invention have been presented herein in the context of two heterogeneous strings of LEDs in a luminaire, and correspondingly, two current regulators. Those of skill in the art will readily appreciate that the inventive approach disclosed herein may be advantageously applied to any number of LED strings and current regulators, comprising any mix of types (sizes, colors, etc.) of LEDs. Although depicted as individual circuits, the current regulators may be integrated—so long as the integrated current regulator is operative to individually control the current to each LED string.

In all embodiments, the controller 52 may comprise any one or more sequential state machines operative to execute machine instructions stored as machine-readable computer programs in memory. For example, the controller 52 may be implemented as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP); or any combination of these. Although the controller 52 includes internal memory, at least in the form of registers, and possibly integrated cache memory, it may also be connected to external memory (not shown in the drawings). Such memory may comprise any non-transitory, machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. Software operative to implement the functionality described herein is stored in memory, and is operative to cause the controller 52 to perform the control functions described herein—for example, to implement functional steps of the method 100.

Embodiments of the present invention present numerous advantages over the prior art. They allow for the implementation of modern, heterogeneous LED luminaires, with their advanced features such as fixed or dynamic control of luminous characteristics (e.g., CRI, CCT, etc.), using widely available, low-cost, constant current power supplies designed to drive a single string of homogeneous LEDs. Furthermore, embodiments described herein enable a greater range of such control, at higher efficiency, than other approaches, such as current shunting. Additionally, with respect to the many constant current power supplies that include brightness control, embodiments of the present invention inherently implement that brightness control, without the need for separate brightness control inputs, as are required for implementations using a constant voltage power supply.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of selectively driving a parallel configuration of a plurality of strings of series-connected light emitting devices (LEDs) from a constant current power supply, comprising:
   providing a plurality of current regulators, each connected in series with an associated string;
   individually regulating a current through each string by controlling the associated current regulator;
   monitoring an output voltage of the constant current power supply; and
   controlling the total current drawn so as to maintain the output voltage of the constant current power supply at a substantially constant value.

2. The method of claim 1 wherein
   the LEDs in at least one string emit a different luminous characteristic than the LEDs in at least one other string; and
   individually regulating the current through each string comprises regulating the string currents according to one or more predetermined ratios to generate a collective light emission having a desired luminous characteristic.

3. The method of claim 2 wherein the desired luminous characteristic is a color rendering index.

4. The method of claim 2 wherein the desired luminous characteristic is a correlated color temperature.

5. The method of claim 1 wherein at least one string comprises blue shifted yellow (BSY) LEDs and at least one string comprises red or red-orange (RDO) LEDs.

6. The method of claim 1 wherein at least one current regulator is a buck regulator.

7. The method of claim 1 wherein the luminous output of the plurality of strings is determined by the total current supplied by the constant current power supply.

8. The method of claim 1 wherein controlling each current regulator comprises periodically sending a command signal to each current regulator, the command signals being adjusted in their relative ratios to regulate the current in each string so as to achieve a collective light emission having a desired luminous characteristic.

9. The method of claim 1 wherein controlling the total current drawn so as to maintain the power supply output voltage at a substantially constant value comprises ratiometrically adjusting the command signals sent to the current regulators by a gain factor determined by monitoring the power supply output voltage.

10. The method of claim 1 further comprising monitoring a total current drawn by the plurality of strings.

11. A control circuit operative to selectively drive a parallel configuration of a plurality of strings of series-connected light emitting devices (LEDs) from a constant current power supply, comprising:
   a current regulator circuit connected in series with each string;
   a voltage monitoring circuit; and
   a controller operatively connected to each current regulator circuit and the voltage monitoring circuit and operative to:
      individually regulate a current through each string by controlling the associated current regulator;
      monitor an output voltage of the constant-current power supply;
      monitor a total current drawn by the plurality of strings; and
      control the total current drawn so as to maintain the output voltage of the constant current power supply at a substantially constant value.

12. The control circuit of claim 11 wherein
   the LEDs in at least one string emit a different luminous characteristic than the LEDs in at least one other string; and
   the controller is operative to individually regulate the current through each string by regulating the string currents according to one or more predetermined ratios to generate a collective light emission having a desired luminous characteristic.

13. The control circuit of claim 12 wherein the desired luminous characteristic is a color rendering index.

14. The control circuit of claim 12 wherein the desired luminous characteristic is a correlated color temperature.

15. The control circuit of claim 11 wherein at least one string comprises blue shifted yellow (BSY) LEDs and at least one string comprises red or red-orange (RDO) LEDs.

16. The control circuit of claim 11 wherein at least one current regulator is a buck regulator.

17. The control circuit of claim 11 wherein the luminous output of the plurality of strings is determined by the total current supplied by the constant current power supply.

18. The control circuit of claim 11 wherein the controller is operative to control each current regulator by periodically sending a command signal to each current regulator, the command signals being adjusted in their relative ratios to regulate the current in each string so as to achieve a collective light emission having a desired luminous characteristic.

19. The control circuit of claim 18 wherein the controller is operative to control the total current drawn so as to maintain the constant current power supply output voltage at a constant value by ratiometrically adjusting the command signals sent to the current regulators by a gain factor determined by monitoring the constant-current power supply output voltage.

20. The control circuit of claim 11 further comprising a current monitoring circuit operatively connected to the controller.

* * * * *